(12) United States Patent
Givot et al.

(10) Patent No.: US 12,358,703 B2
(45) Date of Patent: Jul. 15, 2025

(54) PACKAGED ABRASIVE ARTICLES

(71) Applicant: 3M INNOVATIVE PROPERTIES COMPANY, St. Paul, MN (US)

(72) Inventors: Maiken Givot, St. Paul, MN (US); Melissa C Schillo-Armstrong, Woodbury, MN (US); Thomas P. Besonen, Shoreview, MN (US); Christopher S. Lyons, St. Paul, MN (US); Scott J. Jones, Woodbury, MN (US); David J. Rowe, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 52 days.

(21) Appl. No.: 18/561,755

(22) PCT Filed: May 10, 2022

(86) PCT No.: PCT/IB2022/054339
§ 371 (c)(1),
(2) Date: Nov. 17, 2023

(87) PCT Pub. No.: WO2022/243790
PCT Pub. Date: Nov. 24, 2022

(65) Prior Publication Data
US 2024/0228140 A1    Jul. 11, 2024

Related U.S. Application Data

(60) Provisional application No. 63/190,595, filed on May 19, 2021.

(51) Int. Cl.
*B65D 65/40* (2006.01)
*B24D 3/28* (2006.01)
(Continued)

(52) U.S. Cl.
CPC .............. *B65D 65/40* (2013.01); *B24D 3/28* (2013.01); *B24D 11/008* (2013.01); *B65D 85/68* (2013.01); *B65D 2585/68* (2013.01)

(58) Field of Classification Search
CPC .... B65D 65/40; B65D 85/68; B65D 2585/68; B24D 3/28; B24D 11/008
(Continued)

(56) References Cited

U.S. PATENT DOCUMENTS

| | | |
|---|---|---|
| 2,142,049 A | 12/1938 | Erickson |
| 4,842,893 A | 6/1989 | Yializis et al. |

(Continued)

FOREIGN PATENT DOCUMENTS

| | | |
|---|---|---|
| EP | 1896341 B1 | 11/2013 |
| EP | 2882589 B1 | 3/2017 |

(Continued)

OTHER PUBLICATIONS

International Search Report for PCT International Application No. PCT/IB2022/054339, mailed on Jul. 26, 2022, 5 pages.

(Continued)

*Primary Examiner* — Bryon P Gehman
(74) *Attorney, Agent, or Firm* — Katherine M. Scholz

(57) ABSTRACT

A packaged abrasive article comprises an abrasive article hermetically sealed within a bag. The abrasive article comprises abrasive particles at least partially retained in a phenolic binder. The bag comprises a multilayer barrier film that comprises: a first substrate layer; a first polymerized acrylic layer disposed on the first substrate layer; an aluminosilicate layer disposed on the first polymerized acrylic layer; and a second polymerized acrylic layer disposed on the aluminosilicate layer.

12 Claims, 1 Drawing Sheet

(51) Int. Cl.
*B24D 11/00* (2006.01)
*B65D 85/68* (2006.01)

(58) Field of Classification Search
USPC ..... 206/484–484.2; 428/34.1–35.9, 515–516
See application file for complete search history.

(56) References Cited

U.S. PATENT DOCUMENTS

| | | | |
|---|---|---|---|
| 4,954,371 A | 9/1990 | Yializis | |
| 5,032,461 A | 7/1991 | Shaw et al. | |
| 5,440,446 A | 8/1995 | Shaw et al. | |
| 5,725,909 A | 3/1998 | Shaw et al. | |
| 6,045,864 A | 4/2000 | Lyons et al. | |
| 6,224,948 B1 | 5/2001 | Affinito | |
| 6,231,939 B1 | 5/2001 | Shaw et al. | |
| 6,475,253 B2 | 11/2002 | Culler et al. | |
| 6,635,334 B1 | 10/2003 | Jackson et al. | |
| 7,661,247 B2 | 2/2010 | Schwabel et al. | |
| 7,695,822 B2 * | 4/2010 | Su | B32B 27/18 428/500 |
| 7,775,361 B2 | 8/2010 | Ficai | |
| 7,980,190 B2 | 7/2011 | Kim et al. | |
| 8,658,248 B2 | 2/2014 | Anderson et al. | |
| 9,180,573 B2 * | 11/2015 | Givot | B24D 11/00 |
| 9,486,896 B2 * | 11/2016 | Zhang | B24D 3/004 |
| 9,573,250 B2 * | 2/2017 | Schwabel | B24D 11/00 |
| 10,005,171 B2 * | 6/2018 | Culler | B24D 3/14 |
| 10,668,597 B2 | 6/2020 | Poluha et al. | |
| 10,784,455 B2 * | 9/2020 | Klun | B32B 15/09 |
| 11,254,101 B2 * | 2/2022 | Sitter | C08J 7/048 |
| 2006/0003121 A1 | 1/2006 | Scheller et al. | |
| 2007/0000214 A1 | 1/2007 | Schwabel et al. | |
| 2007/0125674 A1 | 6/2007 | Ficai | |
| 2016/0032674 A1 | 2/2016 | Nguyen et al. | |
| 2016/0326741 A1 | 11/2016 | Lyons et al. | |
| 2018/0169697 A1 | 6/2018 | Merton et al. | |
| 2022/0001644 A1 * | 1/2022 | Rowe | B32B 15/20 |

FOREIGN PATENT DOCUMENTS

| | | |
|---|---|---|
| EP | 2519454 B1 | 2/2018 |
| EP | 3227053 B1 | 1/2021 |
| JP | 6169755 B2 | 7/2017 |
| WO | 2017062982 A1 | 4/2017 |
| WO | 2018017552 A1 | 1/2018 |
| WO | 2019003032 A1 | 1/2019 |
| WO | 2020081870 A1 | 4/2020 |

OTHER PUBLICATIONS

Stang, "Formulation and Moisture Influences on The Service Life of Phenolic Resin-Bonded Cut-Off Wheels", Institute of polymer technology, 5 pages.

* cited by examiner

PACKAGED ABRASIVE ARTICLES

CROSS REFERENCE TO RELATED APPLICATIONS

This application is a national stage filing under 35 U.S.C. 371 of PCT/IB2022/054339, filed May 10, 2022, which claims the benefit of U.S. Provisional Application No. 63/190,595, filed May 19, 2021, the disclosure of which is incorporated by reference in its/their entirety herein.

TECHNICAL FIELD

The present disclosure broadly relates to packaged abrasive articles.

BACKGROUND

Abrasive articles are generally manufactured at a first location, shipped to a distributor at a second location, sometimes one or several vendors, and then to a customer at a third location where they are utilized. The environmental conditions during the shipment and storage of the abrasive article can negatively affect the performance of the abrasive article. For example, extended storage in humid conditions has been observed to negatively affect the performance of phenolic resin based abrasive articles such as, for example, resin-bonded cut-off wheels (COWs).

Paper packaging, including for example, cardboard, has been used to package a variety of abrasive articles to help contain the abrasive articles and reduce their exposure to environmental conditions. The cardboard packaging allows air and moisture to transfer through and subjects the packaged abrasive article to environmental fluctuations.

Shrink wrap or blister packs have also been used to package a variety of abrasive articles to help reduce packaging costs and reduce exposure to environmental conditions. When shrink wrap is used, the abrasive articles to be packaged are typically enclosed in the shrink wrap. The enclosure is then subjected to an environment with an elevated temperature that causes the shrink wrap to shrink around the abrasive articles to produce a tight wrapping that closely conforms to the outer contour of the abrasive articles. The inner portion of the wheels is not always covered by the shrink wrap, allowing for air and moisture to enter the packaging structure. Vents, such as a series of pinholes, are usually provided in the shrink wrap to allow the enclosed air to evacuate during the shrinking process. After wrapping, the shrink wrap allows air and moisture to transfer through the shrink wrap and subjects the packaged abrasive article to environmental fluctuations.

In another approach, U.S. Pat. No. 7,661,247 (Schwabel et al.) discloses a system for packaging resin bonded abrasive articles that includes a flexible package comprising a multilayer barrier film that optionally contains a metal layer.

SUMMARY

The present disclosure provides packaged abrasive articles capable of lengthy storage without appreciable loss of abrasive properties of the abrasive article contained therein. In many implementations the packaging is recyclable, biodegradable, and/or compostable.

In one aspect, the present disclosure provides a packaged abrasive article comprising:
a hermetically sealed bag comprising a multilayer barrier film, wherein the multilayer barrier film comprises:
a first substrate layer;
a first polymerized acrylic layer disposed on the first substrate layer;
an aluminosilicate layer disposed on the first polymerized acrylic layer; and
a second polymerized acrylic layer disposed on the aluminosilicate layer; and
an abrasive article disposed within the hermetically sealed bag, wherein the abrasive article comprises abrasive particles at least partially retained in a phenolic binder.

As used herein:
the term "hermetically sealed" means sealed in an airtight manner;
the term "(meth)acrylate refers to acrylate and/or methacrylate; and
the term "water vapor transmission rate" refers to the rate of water vapor transmission through the multilayer barrier film as measured using the test described in ASTM F1249-01, (Standard Test Method for Water Vapor Transmission Rate Through Plastic Film and Sheeting Using a Modulated Infrared Sensor, Published December 2001), incorporated herein by reference.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The figures may not be drawn to scale.

DETAILED DESCRIPTION

Figure 1:
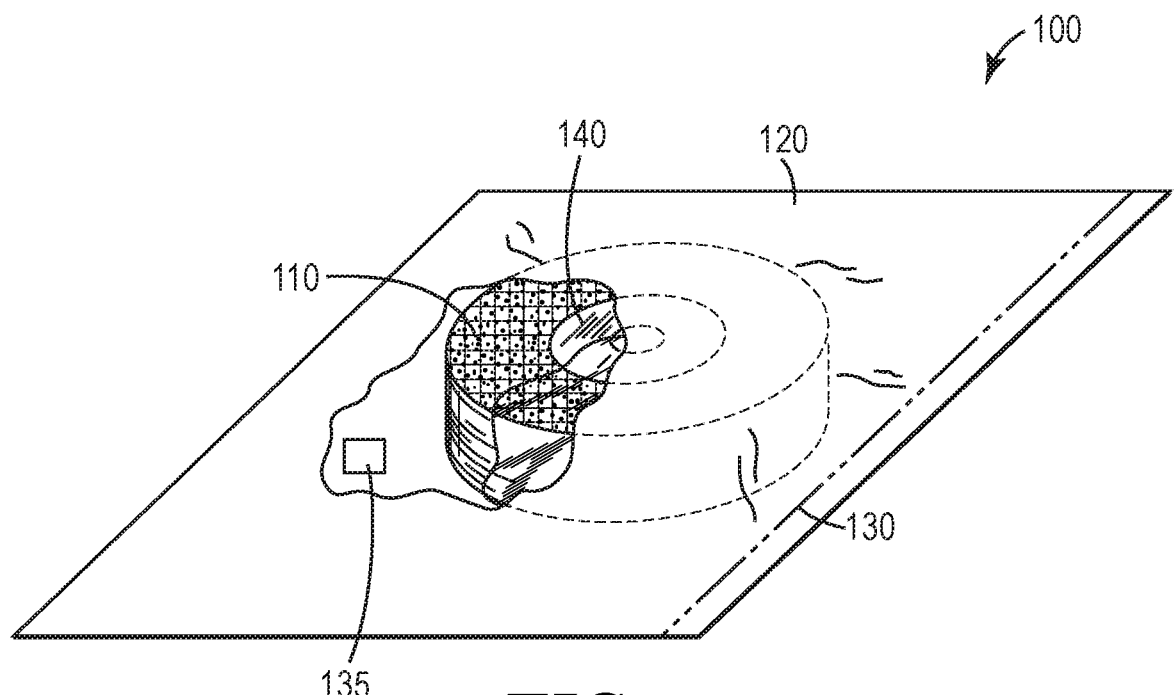
FIG. 1 is a schematic perspective view of a packaged abrasive article 100 according to the present disclosure.

Referring now to FIG. 1, packaged abrasive article 100 comprises bonded abrasive wheels 110 (shown as cut-off wheels) which are hermetically sealed in bag 120 by heat seal 130. Bag 120 also contains optional desiccant 135. Optional label 140 is affixed to bonded abrasive wheels 110. Bag 120 comprises multilayer barrier film 150, shown in greater detail in FIG. 2.

Figure 2:
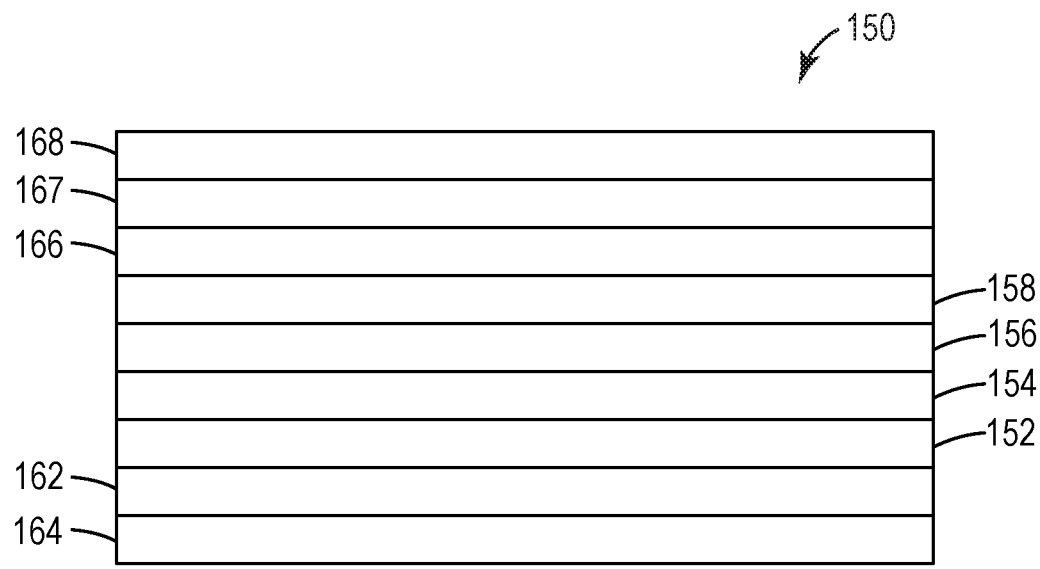
FIG. 2 is a schematic side view of multilayer barrier film 150.

Referring now to FIG. 2, multilayer barrier film 150 comprises first polymerized acrylic layer 154 is disposed on first substrate layer 152. Aluminosilicate layer 156 is disposed on the first polymerized acrylic layer 154; and second polymerized acrylic layer 158 is disposed on aluminosilicate layer 156.

Optional first adhesive layer 162 is disposed on first substrate layer 152, and optional heat sealable layer 164 is disposed on optional first adhesive layer 162. Optional second adhesive layer 166 is disposed on second polymerized acrylic layer 158, and optional metal layer 167 is disposed on optional second adhesive layer 166. Second substrate layer 168 is disposed on optional metal layer 167, if present, or on second adhesive layer 166 if not present.

The first substrate is conveniently a layer comprising one more organic polymers. While diverse polymers may be used, the polymers that contribute to puncture resistance such as polyethylene (PE), polyethylene terephthalate (PET), polypropylene (PP), polyethylene naphthalate (PEN), polyether sulfone (PES), polycarbonate, polyester carbonate, polyetherimide (PEI), polyarylate (PAR), polymers with the trade designation ARTON (available from the Japanese Synthetic Rubber Co., Tokyo, Japan), polymers with trade designation AVATREL (available from the B. F. Goodrich Co., Brecksville, Ohio), polyethylene-2, 6-naphthalate, polyvinylidene difluoride, polyphenylene oxide, polyphenylene sulfide, polyvinyl chloride (PVC), ethylene vinyl alcohol (EVOH), and combinations thereof. Also useful are thermoset polymers such as polyimide, polyimide benzoxazole, polybenzoxazole, and cellulose derivatives. Polyethylene terephthalate (PET) with a thickness of approximately 0.002 inch (0.05 mm) is considered a convenient choice, as is biaxially oriented polypropylene (BOPP) film. Biaxially oriented polypropylene (BOPP) is commercially available from several suppliers including: ExxonMobil Chemical Company of Houston, Texas; Continental Polymers of Swindon, UK; Kaisers International Corporation of Taipei City, Taiwan and PT Indopoly Swakarsa Industry (ISI) of Jakarta, Indonesia. Other examples of suitable film material are disclosed in U.S. Pat. No. 6,635,334 (Jackson et al.). In some embodiments, the substrate may be a lamination of two or more polymeric layers.

In some embodiments, the first substrate layer comprises at least one recyclable polymer such as, for example, polyethylene.

In some embodiments, the first substrate layer comprises at least one biodegradable and/or compostable thermoplastic polymer. Exemplary thermoplastic biodegradable polymers include polylactic acid, polycaprolactone, polybutylene succinate, poly-3-hydroxybutyrate, poly-4-hydroxybutyrate, polyhydroxyvalerate, poly-3-hydroxyhexanoate, polyhydroxyoctanoate, and thermoplastic cellulose derivatives (e.g., cellulose ether esters, hydroxyalkyl ethers).

The first substrate layer may have any thickness of, for example, from about 0.0004 inch (0.010 mm) up to about 0.020 inch (0.51 mm), although other thicknesses may also be used.

The optional second substrate layer may be compositionally the same as, or different from, the first substrate layer and may comprise any of the foregoing polymers listed as suitable for the first substrate layer. Likewise, the optional second substrate layer may have the same or different thickness as the first substrate layer. Both the first substrate layer and/or the optional second substrate layer may be provided by extrusion (including coextrusion) or provided as a free standing film, for example.

The first and second polymerized acrylic layers may be compositionally the same or different. Likewise they may have different or the same thickness. The first polymerized acrylic layer is disposed on the first substrate layer, and the second polymerized acrylic layer is disposed on the aluminosilicate layer. The first and second polymerized acrylic layers may have a thickness of, for example, from about 0.0001 inch (0.0025 mm) up to about 0.00020 inch (0.005 mm), although other thicknesses may also be used.

The first polymerized and/or second acrylic layers may be formed, for example, by flash evaporation of (meth)acrylate monomer and vapor deposition, followed by crosslinking of the (meth)acrylate monomer, with volatilizable (meth)acrylate monomers being preferred. Coating may be accomplished of the monomer may also be accomplished by conventional coating methods such as roll coating (e.g., gravure roll coating) or spray coating (e.g., electrostatic spray coating). Further details concerning deposition and polymerization can be found in, for example, U.S. Pat. No. 4,842,893 (Yializis et al.); U.S. Pat. No. 4,954,371 (Yializis); U.S. Pat. No. 5,032,461 (Shaw et al.; U.S. Pat. No. 5,440,446 (Shaw et al.); U.S. Pat. No. 5,725,909 (Shaw et al.); U.S. Pat. No. 6,231,939 (Shaw et al.); U.S. Pat. No. 6,045,864 (Lyons et al.); U.S. Pat. No. 6,224,948 (Affinito), and U.S. Pat. No. 8,658,248 (Anderson et al.).

In some embodiments, a suitable (meth)acrylate monomer has sufficient vapor pressure to be evaporated in an evaporator and condensed into a liquid or solid coating in a vapor coater. Examples of suitable monomers include hexanediol diacrylate, ethoxyethyl acrylate, cyanoethyl(mono)acrylate; isobornyl (meth)acrylate, octadecyl acrylate, isodecyl acrylate, lauryl acrylate, beta-carboxyethyl acrylate, tetrahydrofurfuryl acrylate, dinitrile acrylate, pentafluorophenyl acrylate, nitrophenyl acrylate, 2-phenoxyethyl (meth)acrylate, diethylene glycol diacrylate, triethylene glycol di(meth)acrylate, tripropylene glycol diacrylate, tetraethylene glycol diacrylate, neopentyl glycol diacrylate, propoxylated neopentyl glycol diacrylate, polyethylene glycol diacrylate, tetraethylene glycol diacrylate, bisphenol A epoxy diacrylate, 1,6-hexanediol dimethacrylate, trimethylolpropane triacrylate, ethoxylated trimethylolpropane triacrylate, propylated trimethylolpropane triacrylate, tris(2-hydroxyethyl)-isocyanurate triacrylate, pentaerythritol triacrylate, phenylthioethyl acrylate, naphthloxyethyl acrylate, epoxy acrylate under the product number RDX80094 (available from RadCure Corp., Fairfield, New Jersey), and mixtures thereof. A variety of other curable materials can be included in the polymer layer, such as, e.g., vinyl ethers, vinyl naphthalene, acrylonitrile, and mixtures thereof.

In particular, tricyclodecanedimethanol diacrylate is considered suitable. It is conveniently applied by, e.g., condensed organic coating followed by ultraviolet (UV) irradiation-initiated free radical vinyl polymerization. A thickness between about 250 and 1500 nanometers (nm) is considered convenient, with approximately 750 nm in thickness being considered particularly suitable.

The optional second substrate layer may be compositionally the same as, or different from, the first substrate layer and may comprise any of the foregoing polymers listed as suitable for the first substrate layer. Likewise, the optional second substrate layer may have the same or different thickness as the first substrate layer. Both the first substrate layer and/or the optional second substrate layer may be provided by extrusion (including coextrusion) or provided as a free-standing film, for example.

The aluminosilicate layer is disposed on the first polymerized acrylic layer and comprises a mixed oxide composed of aluminum, silicon, and oxygen.

The aluminosilicate layer may be prepared by a variety of methods such as, for example, those described in U.S. Pat. No. 7,980,910 (Padiyath et al.) and U.S. Patent Application No. 2016/032674 (Lyons et al.). The aluminosilicate layer can typically be prepared by evaporation, e-beam evaporation, reactive evaporation, reactive sputtering, chemical vapor deposition, plasma enhanced chemical vapor deposition, and atomic layer deposition. Preferred methods include vacuum preparations such as e-beam evaporation, reactive evaporation, reactive sputtering and plasma enhanced chemical vapor deposition.

The aluminosilicate layer may be conveniently applied as a thin layer (e.g., by sputtering). It may provide good water vapor barrier properties, as well as good interfacial adhesion to adjacent layers. Any suitable thickness may be used; however, a thickness between about 5 nm and 100 nm is considered convenient, with approximately 20 nm in thickness being considered particularly suitable.

Various optional layers may also be included in the multilayer barrier film. In some embodiments, the multilayer barrier film further includes a first adhesive layer disposed on the first substrate layer. The adhesive may comprise a pressure-sensitive adhesive, hot melt adhesive, and/or thermosetting resin, for example. In one embodiment, adhesive comprises a two-component laminating adhesive system that combines an isocyanate-terminated polyester urethane with a co-reactant commercially available as ADCOAT 577 from Dow Chemical of Midland, Michigan. Any suitable thickness may be used; however, a thickness between about 500 and 50,000 (nm) is considered convenient, with approximately 2000 nm is considered particularly convenient.

A heat sealable layer may optionally be disposed on the first adhesive layer. Any heat-sealable polymer may be used. Generally, the melting and/or softening point of the heat-sealable polymer should be below that of the first and second substrates. Polyethylene, or a blend of linear low-density polyethylene and low-density polyethylene are considered suitable. A heat seal layer may be applied to the barrier film by extrusion, coating, or lamination. A co-extruded layer comprising a high-density polyethylene is also considered suitable.

In some embodiments, hermetic sealing of the bag may be accomplished by other means such as, for example, adhesive transfer tape or packaging tape.

In some embodiments, the multilayer barrier film further comprises a second adhesive layer disposed on the second polymerized acrylic layer. The second adhesive layer may be compositionally and/or dimensionally the same as or different than the first adhesive layer. Materials suitable for use in the first adhesive layer are also suitable for use in the second adhesive layer.

In some embodiments, the multilayer barrier film further comprises an optional metal layer disposed on the second adhesive layer. Exemplary metals include aluminum, copper, and stainless steel, although other metals may also be used. Typical thicknesses of the optional metal layer are 5 to 20 microns, although any thickness may be used. In some embodiments the metal layer comprises an aluminum layer of 6 to 10 microns thickness.

In some embodiments, the multilayer barrier film further comprises a second substrate layer, which can be compositionally and/or dimensionally the same as, or different from the first substrate layer. Materials and dimensions suitable for use in the first substrate layer are also suitable for use in the second substrate layer. In certain embodiments, polyethylene terephthalate is particularly useful.

Optionally, a desiccant may be included in the sealed bag to scavenger any water vapor that may be present after sealing the bag, but generally it is unnecessary. One useful desiccant is anhydrous silica gel.

Phenolic resins are commonly used to form phenolic binder in abrasive articles and is used in both the powder form (e.g., novolac phenolic resins) and liquid state (e.g., resole phenolic resins). Phenolic binders may also be modified with other binder material(s) to improve or alter the properties of the phenolic binder. As used herein, such materials are included within the meaning of the term "phenolic binder". For example, the phenolic binder may be modified with a rubber to improve the toughness of the overall binder.

The various types of abrasive articles will be known to those of ordinary skill in the abrasive arts and are briefly set forth below.

Coated abrasive articles generally include a backing, abrasive particles, and at least one binder (in this instance a phenolic binder) to hold the abrasive particles onto the backing. Examples of suitable backing materials include woven fabric, polymeric film, vulcanized fiber, a nonwoven fabric, a knit fabric, paper, combinations thereof, and treated versions thereof. The abrasive particles can be present in one layer or in two layers of the coated abrasive article. Examples of coated abrasive article include abrasive discs (including vulcanized fiber abrasive discs), abrasive sheets and belts.

Bonded abrasive articles typically include a shaped mass of abrasive particles held together by an organic binder (in this instance a phenolic binder), which may contain optional additives such as, for example, fillers, pore formers, and grinding aids. Such shaped mass can be, for example, in the form of a wheel such as a grinding wheel or cut-off wheel. The shaped mass can also be in the form, for example, of a honing stone, segment, mounted point, disc, or other conventional bonded abrasive shape.

Nonwoven abrasive articles typically include an open porous lofty polymer filament structure having abrasive particles according to the present disclosure distributed throughout the structure and adherently bonded therein by an organic binder (in this instance a phenolic binder). Examples of filaments include polyester fibers, polyamide fibers, and polyaramid fibers.

Select Embodiments of the Present Disclosure

In a first embodiment, the present disclosure provides a packaged abrasive article comprising:
  a hermetically sealed bag comprising a multilayer barrier film, wherein the multilayer barrier film comprises:
    a first substrate layer;
    a first polymerized acrylic layer disposed on the first substrate layer;
    an aluminosilicate layer disposed on the first polymerized acrylic layer; and
    a second polymerized acrylic layer disposed on the aluminosilicate layer; and
  an abrasive article disposed within the hermetically sealed bag, wherein the abrasive article comprises abrasive particles at least partially retained in a phenolic binder.

In a second embodiment, the present disclosure provides a packaged abrasive article according to the first embodiment, wherein the abrasive article comprises a bonded abrasive article.

In a third embodiment, the present disclosure provides a packaged abrasive article according to the first embodiment, wherein the abrasive article comprises a coated abrasive article.

In a fourth embodiment, the present disclosure provides a packaged abrasive article according to the first embodiment, wherein the abrasive article comprises a nonwoven abrasive article.

In a fifth embodiment, the present disclosure provides a packaged abrasive article according to any of the first to fourth embodiments, wherein the first substrate layer comprises polyethylene terephthalate.

In a sixth embodiment, the present disclosure provides a packaged abrasive article according to any of the first to fourth embodiments, wherein the first substrate layer is biodegradable and/or recyclable.

In a seventh embodiment, the present disclosure provides a packaged abrasive article according to the sixth embodiment, wherein the first substrate layer comprises at least one of polylactic acid, polycaprolactone, polybutylene succinate, poly-3-hydroxybutyrate, poly-4-hydroxybutyrate, polyhydroxyvalerate, poly-3-hydroxyhexanoate, polyhydroxyoctanoate, or a thermoplastic cellulose derivative.

In an eighth embodiment, the present disclosure provides a packaged abrasive article according to any of the first to sixth embodiments, further comprising:

a first adhesive layer disposed on the first substrate layer; and a heat sealable layer disposed on the first adhesive layer.

In a ninth embodiment, the present disclosure provides a packaged abrasive article according to the eighth embodiment, wherein the heat sealable layer comprises linear low density polyethylene.

In a tenth embodiment, the present disclosure provides a packaged abrasive article according to the first to eighth embodiments, further comprising:

a second adhesive layer disposed on the second polymerized acrylic layer;

a metal layer disposed on the second adhesive layer opposite the second polymerized acrylic layer; and a second substrate layer disposed on the metal layer opposite the second adhesive layer.

In an eleventh embodiment, the present disclosure provides a packaged abrasive article according to the first to eighth embodiments, further comprising:

a second adhesive layer disposed on the second polymerized acrylic layer; AND a second substrate layer disposed on the second adhesive layer opposite the second polymerized acrylic layer In a twelfth embodiment, the present disclosure provides a packaged abrasive article according to the tenth or eleventh embodiment, wherein the second substrate layer comprises polyethylene terephthalate.

In a thirteenth embodiment, the present disclosure provides a packaged abrasive article according to the twelfth embodiment, wherein the second substrate layer is biodegradable and/or recyclable.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight; and wt. % means weight percent. Table 1, below, reports materials used in the Examples.

TABLE 1

| ACRONYM | DESCRIPTION AND SOURCE | COMMENTS |
|---------|------------------------|----------|
| COW | 3M CUBII COW 41 125 mm × 1 mm × 22.23 mm PN65512 from 3M Corporation, Saint Paul, Minnesota | Cut-off wheels |
| ISG | Indicating silica gel pack, 10 grams from Interteck Packaging, Orchard Park, New York | Indicating silica gel pack |
| ML-FB | Multilayer (PET/Al/LDPE) barrier film bag outside dimensions 210 mm × 260 mm, polyethylene terephthalate (PET) = 12 microns thick, aluminum = 8 microns thick, low density polyethylene (LDPE) = 120 microns thick, from AKAT GROUP Sp. Z. O. O. in Swieta Katarzyna, Poland | Foil bag |
| ML-mPET | Multilayer metalized PET barrier film with aluminosilicate layer sandwiched between polymerized acrylic layer made as described in EXAMPLE 2 | Multilayer barrier film |
| ML-tPET | Multilayer transparent PET barrier film with aluminosilicate layer sandwiched between polymerized acrylic layer made as described in EXAMPLE 1 | Multilayer barrier film |
| PB1 | ACHub stand-up reusable food storage bags 9.9 in (25.1 cm) × 9.2 in (23.3 cm) × 0.5 in (1.3 cm), 7.2 ounces (0.20 kg), composed of 3 layers. The innermost layer is a patented film that absorbs ethylene gas and controls humidity, the second layer is LDPE to improve elastic strength and the outer layer is Nylon to provide extra durability and barrier to oxygen from AltCookingHub | Polymer bag |
| PB2 | Reusable Ziploc seal top bags, leakproof made of food grade PEVA by Ehoovis from Amazon | Polymer bag |
| RC1 | Polypropylene container orange in color with black lid sold by Walter Surface Technologies in Pointe-Claire, Qc H9R 1C1 originally containing Zip Stainless Cut-off wheels Qty 25 No 11-F- 052 in size 5" × 3/64" (.045") (125 × 1.2 × 22 mm) Pack/E 180905 SKU 662980310540 | Rigid container |
| RC2 | Polypropylene container black in color sold by Flexovit/Saint-Gobain in Australia originally containing Flexovit Maxx Reinforced Cut-Off Wheel 25 Pack, 125 × 1.0 × 22.23 mm, P/N 66252837155 | Rigid container |
| RC3 | Acrylonitrile butadiene styrene (ABS) 26 clear Mat. No. 73217 DI 115 67/1 and black Mat. No 73219 DI-W 115 67/1 I black 01 container intended to contain Pferd Cut-Off wheels, obtained from Rose Plastic in Coal Center, Pennsylvania | Rigid container |
| RC4 | Polypropylene Unibox container Mat. No. 57500 UB 125 × 40/1 transp. PP 23 obtained from Rose Plastic\ | Rigid container |
| RC5 | High density polyethylene Messerkopf-Pack container Mat. No. 47630 MK 125 130K natural HDPE 01 obtained from Rose Plastic | Rigid container |
| RC6 | Metal tin made in China but sold by Robert Bosch Power Tools GmBH in Stuttgart, Germany originally containing Bosch X-lock Cut-off wheels 125 × 1 × 22.23 mm with designation 10 × 2 608 619 262 | Rigid container |

Cut-off wheels were held in various conditions with and without packaging according to the examples. Performance of the wheel was quantified by a cutting test method as described below.

Cutting Test Method

A 40-inch (1 m) long sheet of 0.12 inch (3 mm) thick stainless steel was secured with its major surface inclined at a 35-degree angle relative to horizontal. A guide rail was secured along the downward-sloping top surface of the inclined sheet. A DeWalt Model DWE43114N 4.5-inch (11.4-cm)/5-inch (12.7-cm) cut-off wheel angle grinder was secured to the guide rail such that the tool was guided in a downward path under the force of gravity. A cut-off wheel for evaluation was mounted on the tool such that the cut-off wheel encountered the full thickness of the stainless steel sheet when the cut-off wheel tool was released to traverse downward, along the rail under gravitational force. The cut-off wheel tool was activated to rotate the cut-off wheel at 11000 rpm, and then the tool was released to begin its descent. The length of the resulting cut in the stainless steel sheet was measured and the time of the cut was recorded. Dimensions and mass of the cut-off wheel were measured before and after the cutting test to determine wear rate of the wheel. Wear rate [mm3/min] is the rate of volume removal of the wheel as it cuts.

Pre-Conditioning

Four hundred COW were removed from all packaging materials and conditioned in an oven at 130° C. for 24 hours. Further use of these heat-treated wheels refers to them as "pre-conditioned". Three wheels were tested immediately after pre-conditioning (Day 0) by the cutting test method to provide a baseline of wear rate (WR) performance for the other samples in the packaging study.

Comparative Example A

Twenty-four (24) pre-conditioned COWs were placed in a low humidity storage unit (XD-302 dry cabinet made by XDry (Anna, Texas) at 5.0% R/H and ambient temperature). Three wheels were removed from the storage unit at each interval of 7, 14, 21, 28, 42, 84 and 182 days. The wheels were post-conditioned at 65° C. for 2 hours and then tested by the cutting test method.

Comparative Example B

Twenty-four (24) pre-conditioned COWs were placed in an environmental chamber at 90% RH and 90° F. (32° C.). Three wheels were removed from the storage unit at each interval of 7, 14, 21, 28, 42, 84 and 182 days. The wheels were post-conditioned at 65° C. for 2 hours and then tested by the cutting test method.

Comparative Example C

Comparative Example B was repeated, except that prior to placing the pre-conditioned wheels in the environmental chamber, they were packaged in ML-FB. The ML-FB bag was sealed by closing the Ziploc seal. Three wheels were removed from the ML-FB packaging at each interval of 7, 14, 21, 28, 42, 84 and 182 days. The wheels were post-conditioned at 65° C. for 2 hours and then tested by the cutting test method.

Comparative Example D

Comparative Example C was repeated except that the ML-FB bag was sealed by closing the Ziploc seal and heat-sealing at 170° C. and 3300 kg pressure for 4 seconds. The pouch was heat-sealed at 170° C. and 3300 kg for 4 seconds after each set of three wheels was removed.

Comparative Example E

Comparative Example D was repeated with the addition of a ISG desiccant pack placed within the heat-sealed bag. The pouch was heat-sealed at 170° C. and 3300 kg for 4 seconds after each set of three wheels was removed.

Comparative Example F

Comparative Example B was repeated except that prior to placing the pre-conditioned wheels in the environmental chamber, they were placed in PB1 and then the container was closed.

Comparative Example G

Comparative Example B was repeated except that prior to placing the pre-conditioned wheels in the environmental chamber, they were placed in PB2 and then the container was closed.

Comparative Example H

Comparative Example B was repeated except that prior to placing the pre-conditioned wheels in the environmental chamber, they were placed in RC1 and then the container was closed.

Comparative Example I

Comparative Example B was repeated except that prior to placing the pre-conditioned wheels in the environmental chamber, they were placed in RC2 and then the container was closed.

Comparative Example J

Comparative Example B was repeated except that prior to placing the pre-conditioned wheels in the environmental chamber, they were placed in RC3 and then the container was closed.

Comparative Example K

Comparative Example B was repeated except that prior to placing the pre-conditioned wheels in the environmental chamber, they were placed in RC4 and then the container was closed.

Comparative Example L

Comparative Example B was repeated except that prior to placing the pre-conditioned wheels in the environmental chamber, they were placed in RC5 and then the container was closed. The small hole in the bottom of RC5 was covered with multiple pieces of tape.

Comparative Example M

Comparative Example B was repeated except that prior to placing the pre-conditioned wheels in the environmental chamber, they were placed in RC6 and then the container was closed.

Comparative Example N

Twelve (12) pre-conditioned COWs were placed in RC1 with a ISG desiccant pack on top of the wheels. The container was closed and put in an environmental chamber at 90% RH and 90° F. (32° C.). Three wheels were removed from the storage unit at each interval of 7, 14, 21 and 28 days. The wheels were post-conditioned at 65° C. for 2 hours and then tested by the cutting test method.

Example 1

The following example of barrier films was made on a vacuum coater similar to the coater described in U.S. Pat. No. 7,980,190 (Padiyath et al.) with the exception of using two monomer evaporators and curing units instead of one monomer evaporator source. The coater was threaded up with a substrate in the form of an indefinite length roll of 0.015 millimeters (mm) thick, 137.2 to 165.1 centimeters (cm) wide PET film (Mylar D804 from DuPont—Teijin Films of Chester, Virginia). The substrate was then advanced at a constant line speed of 52 feet per minute (15.8 m/min). The substrate was prepared for coating by subjecting it to a nitrogen plasma treatment to improve the adhesion of the low thermal conductivity organic layer.

An organic layer was formed on the substrate by applying a mixture of tricyclodecanedimethanol diacrylate, commercially available as SARTOMER SR833S from Sartomer USA of Exton, Pennsylvania, and 5 weight percent (wt. %) of 1-hydroxycyclohexyl phenyl ketone, and evaporating to make a coating width of 133.4-142.2 cm. This monomeric coating was subsequently cured with ultraviolet light immediately downstream. The process drum temperature was −10° C.

On top of this now polymerized organic layer, a non-metallic inorganic material, silicon aluminum oxide, was deposited to a thickness of 20 nm. A dual magnetron reactive sputter deposition process was employed using a 40-50 kHz AC power supply. The power for the cathode during sputtering was controlled by a feed-back control loop that monitored the power and controlled the oxygen flow such that the voltage would remain high. The 90% Si/10% Al rotary sputter targets employed in the deposition of the inorganic layer(s) were obtained from Soleras Advanced Coatings US, of Biddeford, Maine.

A further in-line process was used to deposit a second polymeric layer on top of the silicon aluminum oxide layer. This polymeric layer was produced from a monomer solution by evaporation. The material applied to form this top layer was a mixture of 3 wt. % (N-(n-butyl)-3-aminopropyltrimethoxysilane commercially available as DYNASYLAN 1189 from Evonik of Essen, Delaware, 5 weight percent (wt. %) of 1-hydroxycyclohexyl phenyl ketone, with SARTOMER SR833S. Once condensed onto the silicon aluminum oxide layer, the coated mixture was cured by ultraviolet light to a finished polymer.

The resultant barrier stack was then coated with polymeric layers using an Adcote 577/577B adhesive (Rohm and Haas Co., Philadelphia, Pennsylvania) with a thickness of 0.5 grains per 4 inches by 6 inches area (32 mg/155 cm$^2$). A first PET film (F-CHE from Flexfilms of Elizabethtown, Kentucky of 24 microns thickness was laminated on the barrier side and then a second Linear Low Density Polyethylene (LLDPE B343T-997 from Printpack, of Atlanta, Georgia) with a caliper of 61 microns and a modulus of 250-270 megapascals (MPa) is laminated on the other side of the PET. The resultant multilayer barrier film is referred to hereinafter as ML-tPET.

Two 12-inch (30-cm)×20-inch (30-cm) pieces of ML-tPET were cut from the roll. Three sides of the two pieces of ML-tPET film were heat-sealed together at 120° C. and 3300 kilograms (kg) for 4 seconds to make a pouch. Twenty-four (24) pre-conditioned COWs were placed in the ML-tPET pouch. The final side of the pouch was heat-sealed at 120° C. and 3300 kg for 4 seconds. The pouch was put in an environmental chamber at 90% RH and 90° F. (32° C.). Three wheels were removed from the storage unit at each interval of 7, 14, 21, 28, 42, 84 and 182 days. The wheels were post-conditioned at 65° C. for 2 hours and then tested by the cutting test method. The pouch was heat-sealed at 120° C. and 3300 kg for 4 seconds after each set of three wheels was removed.

Example 2

Example 1 was repeated except that a 24 microns thick metalized PET with an optical density of 3 was laminated with the metal layer facing toward the metal oxide layer. The resultant multilayer barrier film is further referred to as ML-mPET.

Two 12-inch×20-inch (30-cm×30-cm) pieces of the ML-mPET were cut from the roll. Three sides of the two pieces of ML-mPET film were heat-sealed together at 120° C. and 3300 kg for 4 seconds to make a pouch. Twenty-four (24) pre-conditioned COWs were placed in the ML-mPET pouch. The final side of the pouch was heat-sealed at 120° C. and 3300 kg for 4 seconds. The pouch was put in an environmental chamber at 90% relative humidity (RH) and 90° F. (32 RC). Three wheels were removed from the storage unit at each interval of 7, 14, 21, 28, 42, 84 and 182 days. The wheels were post-conditioned at 65° C. for 2 hours and were tested by the cutting test method. The pouch was heat-sealed at 120° C. and 3300 kg for 4 seconds after each set of three wheels was removed.

The wear rate (WR) of the three pre-conditioned wheels at Day 0 was 4152, 4464, and 4772 mm$^3$/min. The WR of each Comparative Example and Example as a function of days held at the conditions specified is reported in Table 2, below.

TABLE 2

| SAMPLE | WR after 7 days | WR after 14 days | WR after 21 days | WR after 28 days | WR after 42 days | WR after 84 days | WR after 182 days |
|---|---|---|---|---|---|---|---|
| Comp. Ex. A | 4486 | 4332 | 4744 | 4661 | 4125 | 4488 | 4265 |
| | 3607 | 4877 | 4458 | 5322 | 6257 | 4367 | |
| | 4158 | 4961 | 5690 | 4710 | 5609 | 6255 | 4392 |
| Comp. Ex. B | 7410 | 7079 | 7513 | 7324 | 7203 | 7688 | 7913 |
| | 5084 | 6239 | 7037 | 6946 | 7217 | 7503 | 7281 |
| | 5988 | 5540 | 6833 | 7862 | 8714 | 7062 | 7241 |
| Comp. Ex. C | 3163 | 4420 | 3929 | 4498 | 5245 | 7043 | 7764 |
| | 4830 | 4446 | 5003 | 4619 | 4880 | 5683 | 8012 |
| | 5426 | 5006 | 4927 | 5163 | 5967 | 6810 | 8012 |
| Comp. Ex. D | 3538 | 4466 | 3604 | 4757 | 4800 | 5555 | 5342 |
| | 5849 | 3557 | 5234 | 3816 | 4339 | 6288 | 5698 |
| | 5535 | 4056 | 4839 | 4203 | 3569 | 4406 | 4233 |
| Comp. Ex. E | 4438 | 4765 | 4468 | 3960 | 3868 | 6344 | 4455 |
| | 3992 | 4088 | 4448 | 4692 | 3814 | 5848 | 3989 |
| | 4710 | 4378 | 5651 | 4207 | 3358 | 7803 | 4254 |

TABLE 2-continued

| SAMPLE | WR after 7 days | WR after 14 days | WR after 21 days | WR after 28 days | WR after 42 days | WR after 84 days | WR after 182 days |
|---|---|---|---|---|---|---|---|
| Comp. Ex. F | 4093 | 4262 | 5714 | 6211 | 6734 | 7053 | 8426 |
|  | 4723 | 5838 | 5204 | 5393 | 6827 | 7071 | 8248 |
|  | 4400 | 5071 | 6358 | 5942 | 6320 | 7405 | 8180 |
| Comp. Ex. G | 4822 | 5309 | 6243 | 7131 | 7327 | 7063 | 8038 |
|  | 5594 | 5207 | 6947 | 6925 | 6986 | 7051 | 7439 |
|  | 5673 | 6749 | 6542 | 6251 | 6607 | 7122 | 7606 |
| Comp. Ex. H | 4051 | 5387 | 5060 | 5855 | 7542 | 7491 | 7980 |
|  | 4480 | 5017 | 6153 | 7221 | 7107 | 6628 | 7437 |
|  | 5162 | 4878 | 5823 | 5733 | 7319 | 7152 | 8153 |
| Comp. Ex. I | 5382 | 5839 | 5273 | 6415 | 5459 | 7634 | 7546 |
|  | 4348 | 4428 | 5470 | 5522 | 5890 | 6838 | 7785 |
|  | 5698 | 5001 | 6098 | 5102 | 6791 | 6994 | 7333 |
| Comp. Ex. J | 4832 | 6527 | 7794 | 6898 | 8211 | 7332 | 8020 |
|  | 4706 | 5999 | 6879 | 8088 | 7693 | 9997 | 7860 |
|  | 4622 | 5855 | 7323 | 8423 | 6940 | 7346 | 8401 |
| Comp. Ex. K | 5744 | 6675 | 6628 | 6850 | 7325 | 7004 | 8056 |
|  | 5716 | 5753 | 6737 | 7179 | 7046 | 7888 | 7594 |
|  | 4330 | 5932 | 9098 | 7104 | 7457 | 6762 | 7784 |
| Comp. Ex. L | 4830 | 5507 | 7219 | 7739 | 7923 | 7887 | 7593 |
|  | 3950 | 6372 | 5550 | 6105 | 7536 | 7134 | 7679 |
|  | 3862 | 5028 | 7297 | 7494 | 6920 | 7212 | 7413 |
| Comp. Ex. M | 6732 | 5535 | 5874 | 7973 | 6162 | 6866 | 6787 |
|  | 4845 | 6187 | 6420 | 5662 | 6056 | 6823 | 7737 |
|  | 4797 | 5419 | 6701 | 7350 | 7401 | 5998 | 7886 |
| Comp. Ex. N | 5182 | 7543 | 5911 | 6860 |  |  |  |
|  | 4265 | 5393 | 5610 | 6213 |  |  |  |
|  | 4920 | 5120 | 6326 | 7060 |  |  |  |
| Example 1 | 4466 | 4778 | 5046 | 4362 | 4274 | 4743 | 4993 |
|  | 3478 | 3635 | 4789 | 4293 | 4497 | 4826 | 5909 |
|  | 4652 | 4561 | 3776 | 4658 | 4975 | 5206 | 7186 |
| Example 2 | 4550 | 4331 | 4403 | 4776 | 4500 | 4366 | 5655 |
|  | 4249 | 5220 | 4311 | 4119 | 4344 | 5429 | 5832 |
|  | 4162 | 3950 | 4385 | 5020 | 4660 | 4799 | 5043 |

All cited references, patents, and patent applications in this application are incorporated by reference in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A packaged abrasive article comprising:
    a hermetically sealed bag comprising a multilayer barrier film, wherein the multilayer barrier film comprises:
        a first substrate layer;
        a first polymerized acrylic layer disposed on the first substrate layer;
        an aluminosilicate layer disposed on the first polymerized acrylic layer;
        a second polymerized acrylic layer disposed on the aluminosilicate layer;
        an adhesive layer disposed on the second polymerized acrylic layer;
        a metal layer disposed on the second adhesive layer opposite the second polymerized acrylic layer; and
        a second substrate layer disposed on the metal layer opposite the second adhesive layer; and
    an abrasive article disposed within the hermetically sealed bag, wherein the abrasive article comprises abrasive particles at least partially retained in a phenolic binder.

2. The packaged abrasive article of claim 1, wherein the abrasive article comprises a bonded abrasive article.

3. The packaged abrasive article of claim 1, wherein the abrasive article comprises a coated abrasive article.

4. The packaged abrasive article of claim 1, wherein the abrasive article comprises a nonwoven abrasive article.

5. The packaged abrasive article of claim 1, wherein the first substrate layer comprises polyethylene terephthalate.

6. The packaged abrasive article of claim 1, wherein the first substrate layer is biodegradable.

7. The packaged abrasive article of claim 6, wherein the first substrate layer comprises at least one of polylactic acid, polycaprolactone, polybutylene succinate, poly-3-hydroxybutyrate, poly-4-hydroxybutyrate, polyhydroxyvalerate, poly-3-hydroxyhexanoate, polyhydroxyoctanoate, or a thermoplastic cellulose derivative.

8. The packaged abrasive article of claim 1, wherein the adhesive layer is a first adhesive layer, and further comprising:
    a second adhesive layer disposed on the first substrate layer; and
    a heat sealable layer disposed on the second adhesive layer.

9. The packaged abrasive article of claim 8, wherein the heat sealable layer comprises linear low density polyethylene.

10. The packaged abrasive article of claim 1, wherein the second substrate layer comprises polyethylene terephthalate.

11. The packaged abrasive article of claim 10, wherein the second substrate layer is biodegradable.

12. A packaged abrasive article comprising:
    a hermetically sealed bag comprising a multilayer barrier film, wherein the multilayer barrier film comprises:
        a first substrate layer;
        a first polymerized acrylic layer disposed on the first substrate layer;
        an aluminosilicate layer disposed on the first polymerized acrylic layer;
        a second polymerized acrylic layer disposed on the aluminosilicate layer;
        an adhesive layer disposed on the second polymerized acrylic layer; and
        a second substrate layer disposed on the second adhesive layer opposite the second polymerized acrylic layer; and
    an abrasive article disposed within the hermetically sealed bag, wherein the abrasive article comprises abrasive particles at least partially retained in a phenolic binder.

* * * * *

UNITED STATES PATENT AND TRADEMARK OFFICE
CERTIFICATE OF CORRECTION

PATENT NO. : 12,358,703 B2  
APPLICATION NO. : 18/561755  
DATED : July 15, 2025  
INVENTOR(S) : Maiken Givot Page 1 of 1

It is certified that error appears in the above-identified patent and that said Letters Patent is hereby corrected as shown below:

In the Claims

<u>Column 14</u>
Line 25, In Claim 8, after "a first adhesive" delete "laver" and insert -- layer --, therefor Signed and Sealed this
Eleventh Day of November, 2025

John A. Squires
*Director of the United States Patent and Trademark Office*